3,040,095
HYDROLYSIS OF ACETONITRILE TO
ACETAMIDE
Everett E. Gilbert, Morris Township, Morris County, and Edmund J. Rumanowski, Jersey City, N.J., assignors to Allied Chemical Corporation, New York, N.Y., a corporation of New York
No Drawing. Filed July 13, 1960, Ser. No. 42,517
3 Claims. (Cl. 260—561)

This invention relates to the hydrolysis of acetonitrile to acetamide having, among other uses, utility as a solvent and stabilizer.

The hydrolysis of acetonitrile to acetamide by heating a mixture of acetonitrile and water in the presence of a zinc oxide catalyst under super-atmospheric pressure has been suggested (German Patent 551,869 of 1932). As this reaction proceeds, the zinc oxide is converted to zinc salts and water-soluble zinc compounds which have little or no catalytic activity. As a practical matter, the catalyst containing mixture separated from the unreacted acetonitrile and the acetamide can not be used to catalyze additional acetonitrile. In other words, the zinc oxide containing residue separated from the reaction mixture can not be recycled and hence the consumption of zinc oxide catalyst is relatively high.

It is an object of the present invention to provide a catalytic process of hydrolyzing acetonitrile to acetamide which results in good yields of the acetamide and which involves the use of a catalyst, which can be recycled or reused; thus the process of the present invention results in the production of relatively large amounts of acetamide per unit quantity of catalyst employed in the process.

Other objects and advantages of the present invention will be apparent from the following detailed description thereof.

In accordance with this invention, acetonitrile and water, both in the liquid phase and in amounts from about the stoichiometric amount up to 3 or 4 mols of acetonitrile per mol of water, are heated to a temperature of 175–250° C., preferably 190–240° C. under autogenous pressure in the presence of zinc acetate as the catalyst. Surprisingly, we have found that the zinc acetate effectively catalyzes the reaction and the zinc acetate separated from the reaction mixture, after treatment to remove water-insoluble zinc compounds, effectively catalyzes the reaction and can be used for this purpose.

Zinc acetate or the zinc acetate hydrate

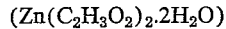

which is the usual commercial form of zinc acetate, is used as the catalyst. Starting with anhydrous zinc acetate, it is converted to the hydrate in the reaction mixture. The expression "zinc acetate" is used herein to include both the anhydrous and hydrate forms. The amount of zinc acetate used is at least two grams (calculated as the anhydrous form) per mol of nitrile, preferably from two to ten grams per mol. Larger amounts of zinc acetate can be used but do not result in any significant improvement in yield.

The acetonitrile used may be any of the commercially available acetonitriles, including that formed as a by-product in the production of acrylonitrile by reaction of propylene and ammonia. The acetonitrile and water are mixed in at least the stoichiometric amount of nitrile per mol of water, preferably from one to four moles of acetonitrile per mol of water. Use of an excess of water above the stoichiometric amount required for reaction with the acetonitrile should be avoided because it results in a reduction in the yield of acetamide.

The acetonitrile, water and zinc acetate are mixed in a closed vessel and heated to a temperature of 175–250° C., preferably 190–240° C. As the heating proceeds, the pressure rises. During the initial stages of the reaction, the pressure may reach as high as 1,000 p.s.i.g., preferably about 700 p.s.i.g. Thereafter, as the reaction proceeds, the pressure falls due to the formation of acetamide which has a lower vapor pressure than acetonitrile and hence as acetamide is formed, the pressure drops. The pressure at the conclusion of the reaction is usually from 40 to 50 p.s.i.g.

In general, the reaction is continued until the water in the reaction mixture has been consumed by reaction with about one mol of acetonitrile to produce acetamide. The time will depend chiefly on the temperature employed. In general, a residence time of from one to four hours, usually about two hours gives good yields.

The reaction may be carried out batchwise or continuously. When carried out batchwise, an autoclave or bomb, such as a stainless steel bomb, is used as the reactor. Operating continuously, a closed reactor is used having a volumetric capacity to provide the desired residence time and the reactants and catalyst are supplied continuously under pressure through suitable valve controlled conduits to the inlet end of the reactor and the reaction mixture discharged from the exit end.

At the conclusion of the reaction, the reaction mixture is distilled to drive off unreacted acetonitrile. This distillation may be carried out under atmospheric pressure. Thereafter, the residue is distilled under reduced pressure to recover the acetamide. The residue obtained after the latter distillation is dissolved in water employing from 2 to 10 parts of water per part of residue. Insoluble residue is removed from the resulting zinc acetate solution and the latter recycled to the process, i.e., employed in catalyzing another batch, when batch operation is used, or fed to the inlet end of the reactor to supply the zinc acetate catalyst when operating continuously. The water content of the zinc acetate solution supplies in part the water required for the reaction; enough additional water is added to provide the above disclosed proportions of acetonitrile to water.

The following examples are given to illustrate the invention. It will be understood that the invention is not limited to these examples. In these examples, all parts are by weight, temperatures in ° C., and pressures in p.s.i.g. The examples were carried out in a stainless steel bomb (Aminco rocker bomb).

*Example I*

123.3 parts (3 mols) of acetonitrile, 54 parts water (3 mols), and 16.2 parts of zinc acetate

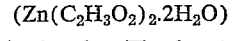

were placed in the bomb. The bomb was then placed in the rocker and heated to a temperature of 225° C. for two hours. The pressure built up from atmospheric to between 500–700 and then fell to 75–150 at the end of two hours. At the end of this two-hour period, the bomb as cooled in air for about ten minutes and thereafter cooled by immersion in water to room temperature.

The contents of the bomb were distilled first at atmospheric pressure, taking off 20 parts of forerunnings distilling within the range of 50–200° C. It was then distilled under vacuum (39 mm. of mercury) obtaining 128 parts of acetamide boiling 130–140° C. at 39 mm. of mercury pressure. Twelve parts were left as residue from the distillation.

The residue was taken up in water (25 parts) and the water-insolubles separated. About three parts of insoluble material were thus obtained and 5.5 parts of water-soluble material, i.e., zinc acetate, which was used to supply a portion of the catalyst in Example II.

Example II 127.4 parts of acetonitrile (3.1 mols), 55.8 parts of water (3.1 mols), 9.6 parts fresh zinc acetate, and 5.5 parts obtained from Example I were placed in the rocker bomb and processed, as described in Example I. 128 parts of acetamide having a boiling point of 130–140° C. (39 mm. of mercury pressure) were obtained.

The catalyst residue produced as described in connection with Example I, i.e., after distilling off the unreacted acetonitrile and acetamide, and removing the water-insolubles, consisted of nine parts zinc acetate which were used to supply a portion of the catalyst in Example III.

Example III 123.3 parts of acetonitrile (3 mols) and 54 parts water (3.0 mols), together with nine parts of the catalyst residue from Examples I and II, and 5.3 parts fresh zinc acetate were placed in the bomb and processed under the same conditions as described in Example I; 128 parts of acetamide were thus obtained.

It will be noted from the above examples that the yields obtained in Examples II and III involving utilization of recycled catalyst were the same as in Example I in which only fresh catalyst was used.

For comparative purposes, the insoluble residue separated from the catalyst mixture was used under the same conditions of molar proportions of acetonitrile to water, temperature, pressure and reaction time, and no hydrolysis of the acetonitrile to acetamide took place.

It will be noted that the present invention provides a process of hydrolyzing acetonitrile to acetamide in the liquid phase involving the use of zinc acetate as the catalyst and results in good yields of the acetamide. This process permits recovery of a major portion of the catalyst in an active form so that it can be recycled or re-used with consequent relatively high production of acetamide per unit quantity of catalyst.

Since certain changes may be made in carrying out the above hydrolysis method without departing from the scope of the invention, it is intended that all matter contained in the above description shall be interpreted as illustrative and not in a limiting sense.

What is claimed is:

1. The process of hydrolyzing acetonitrile to acetamide which comprises heating a liquid phase mixture of acetonitrile and water in the proportions of at least the stoichiometric amount of nitrile per mol of water to a temperature of 175–250° C. under superatmospheric pressure in the presence of zinc acetate catalyst.

2. The process defined in claim 1 in which the zinc acetate catalyst is separated from the reaction mixture at the conclusion of the reaction, washed with water to recover zinc acetate and to separate the zinc acetate thus recovered from the water-insoluble material and the zinc acetate thus recovered is utilized to catalyst the hydrolysis of additional acetonitrile.

3. The process of hydrolyzing acetonitrile to acetamide which comprises heating a liquid phase mixture of from one to four mols of acetonitrile, one mol of water, and at least two grams of zinc acetate per mol of nitrile to a temperature of from 175–250° C. under the superatmospheric pressure developed in said heating, continuing said heating until at least about a mol of acetonitrile has been converted to acetamide, distilling the reaction mixture to drive off the unreacted acetonitrile and acetamide, and leaving a residue containing the catalyst, mixing said residue with water and separating the water-solubles from the water-insolubles, and utilizing the water-soluble material to catalyze the hydrolysis of additional acetonitrile.

References Cited in the file of this patent

UNITED STATES PATENTS

| | | |
|---|---|---|
| 2,511,467 | Gresham | June 13, 1950 |

FOREIGN PATENTS

| | | |
|---|---|---|
| 551,869 | Germany | June 7, 1932 |

UNITED STATES PATENT OFFICE
CERTIFICATE OF CORRECTION

Patent No. 3,040,095                                    June 19, 1962

Everett E. Gilbert et al.

It is hereby certified that error appears in the above numbered patent requiring correction and that the said Letters Patent should read as corrected below.

Column 2, line 59, for "as" read -- was --; column 4, line 16, for "catalyst" read -- catalyze --.

Signed and sealed this 2nd day of October 1962.

(SEAL)
Attest:

ERNEST W. SWIDER
Attesting Officer

DAVID L. LADD
Commissioner of Patents